Jan. 1, 1963 — C. R. TURNER — 3,071,062
FULLY AUTOMATIC TOASTER
Filed Jan. 28, 1960 — 5 Sheets-Sheet 1

INVENTOR:
CHARLES ROGER TURNER
BY Howson & Howson
ATTYS

Jan. 1, 1963

C. R. TURNER 3,071,062

FULLY AUTOMATIC TOASTER

Filed Jan. 28, 1960

INVENTOR:
CHARLES ROGER TURNER
BY
Howson & Howson
ATTYS.

United States Patent Office 3,071,062
Patented Jan. 1, 1963

3,071,062
FULLY AUTOMATIC TOASTER
Charles Roger Turner, Philadelphia, Pa., assignor to The Proctor-Silex Corporation, a corporation of Pennsylvania
Filed Jan. 28, 1960, Ser. No. 5,306
30 Claims. (Cl. 99—329)

This invention relates to automatic bread toasters, and more particularly to toasters of the fully automatic type which operate through a complete toasting cycle in response to the insertion of a bread slice.

In the older form of so-called automatic toasters, the bread carriage is manually lowered to toasting position, such movement stressing a spring which is utilized to return the carriage to non-toasting position after a predetermined toasting time. In some types of fully automatic toasters, motor means is provided to replace manual means to lower the carriage and to simultaneously stress the lifting spring. In others, the carriage is lowered by the force of gravity, and motor means is utilized to lift the carriage to non-toasting position. It has also been proposed to use motor means to move the carriage in both directions.

It is the object of the present invention to provide a novel and improved type of fully automatic toaster in which the bread carriage is moved to toasting position under the force of gravity, and is returned to non-toasting position by a spring which is prestressed by motor means.

It is also an object to provide an improved toaster in which the motor means is deenergized throughout a major portion of the toasting cycle.

It is a further object to provide an improved toaster of the above characteristics that utilizes a thermal motor to stress the spring.

It is also an object to provide an improved toaster of the above type which includes novel means for deenergizing the thermal motor should an obstruction prevent normal completion of its energization cycle.

It is an additional object to provide an improved fully-automatic toaster arranged to operate quietly throughout the whole cycle, with smooth and rapid movement of the carriage in both directions.

This invention is one of two different inventions that have the above advantages.

In my co-pending application, Serial Number 5,305 of even date herewith, the bread carriage is latched in non-toasting position. The insertion of a bread slice trips the latch and the carriage moves into toasting position under the force of gravity. When it reaches toasting position the heating elements are energized. After toasting is completed, a signal from the thermostatic control deenergizes the heating elements and energizes a thermal motor which, on expansion, permits the carriage to move to non-toasting position through the energy stored in a spring. When the carriage reaches non-toasting position it is again latched and the thermal motor is deenergized, whereupon its contraction restresses the spring.

In the present invention, a spring holds the bread carriage in non-toasting position. The insertion of a bread slice energizes a thermal motor which, on expansion, permits the carriage to move into toasting position under the force of gravity without substantial change in the stressed condition of the spring. When it reaches toasting position the carriage is latched, the heating elements are energized, and the thermal motor is deenergized, whereupon a contraction of the thermal motor stores additional energy in the spring. When toasting is completed, a signal from the thermostatic control releases the latch, the heating elements are deenergized, and the carriage is moved to non-toasting position through the energy stored in the spring.

For a better understanding of the present invention, reference is made to the following drawings, in which.

Figure 1:
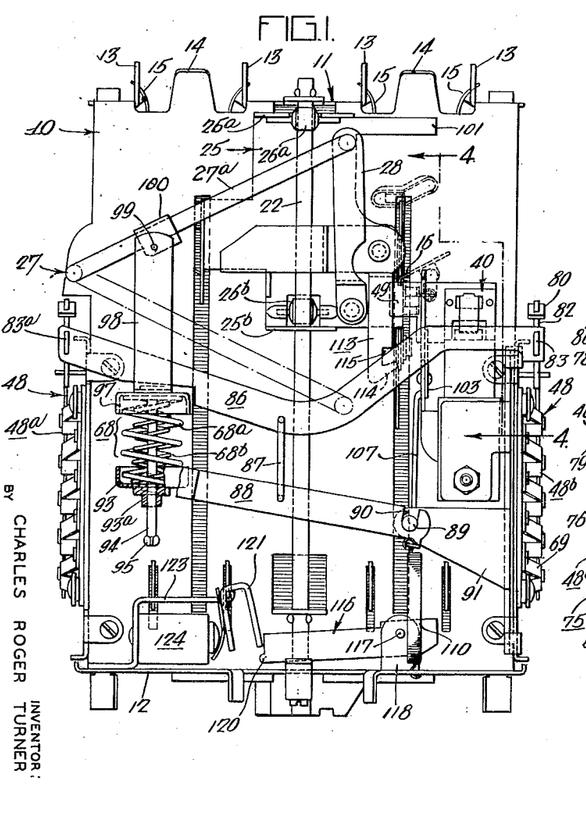
FIG. 1 is an end elevational view of the toaster from one end with the cover removed.
Figure 2:
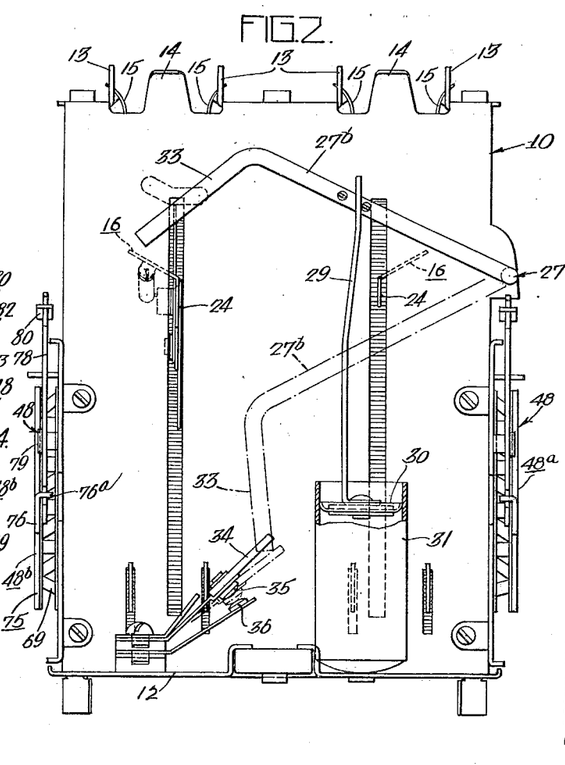
FIG. 2 is an end elevational view of the opposite end of the same structure.

Referring to the drawings, and particularly to FIGS. 1 and 2 thereof, it will be seen that the toaster illustrated is shown without its exterior casing. As shown, the internal frame or chassis, generally designated 10, provides a generally hollow rectangular framework within which are located the effective parts of the toaster including the bread-carrying carriage and the heating elements. As can be seen from FIGS. 3 and 5, in addition to the side walls the frame 10 includes top and bottom walls 11 and 12. The top wall 11 is provided with openings around which are upwardly extending flanges 13 and 14 which define the mouths of the two bread-receiving wells. The wells themselves are defined by parallel grill wires 15 of ripple form in accordance with the teaching of David Saint in U.S. Patent No. 2,847,931 dated August 19, 1958. Movable within the wells thus defined are bread racks 24 which move as a portion of carriage 16 from an upper bread-receiving and removing position, hereinafter referred to as bread-removing position to a lower or toasting position. In the lower position of the carriage a slice of bread lies entirely within the well and in position to be exposed to the heater elements 18 on each side of the well. The heater elements may be provided by high resistance, flat metallic ribbon wound around a suitable insulated support, preferably a suitable frame covered with woven fibre glass. In the space between the heater element and one of the bread wells is provided a thermostatic switch element, here generally designated 20, preferably of the type described and claimed in U.S. Patent No. 2,667,115, dated January 26, 1954, to W. H. Vogelsberg.

Figures 7, 8, 9:
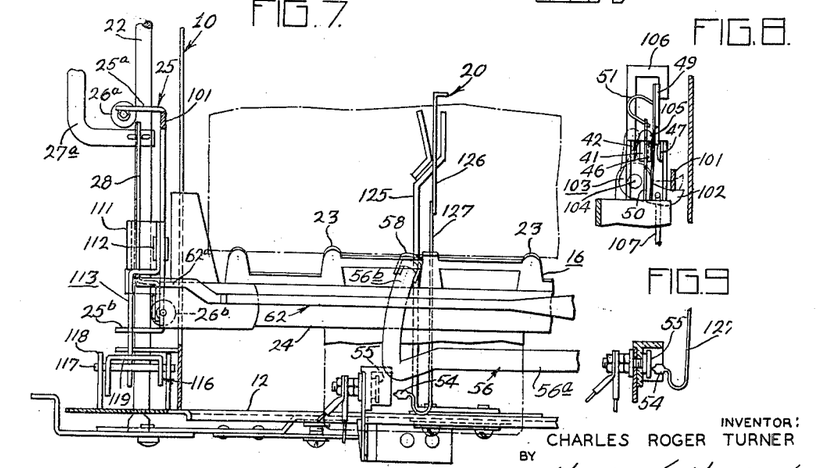
FIG. 7 is a partial sectional view taken along line 7—7 of FIG. 5.
FIG. 8 is a detail view of the switch actuator mechanism which deenergizes the motor means.
FIG. 9 is a detail view of the thermostatic switch.

As seen in FIG. 1, at one side of the toaster there is provided a vertically oriented rod 22 fixed relative to the frame at its opposite ends. A similar guide rod may be provided at the other end of the toaster frame, if desired. As seen in FIG. 7, the toaster carriage 16 is composed of two bread racks 24 including generally horizontal bread-supporting fingers 23 joined at one of their ends by a suitable transverse end portion 25. The end portion 25 is provided at its top and bottom with suitable flanges 25a and 25b which are adapted to slide on the rod 22.

The structure thus far described is much like the structure of the U.S. application of Hild et al., Serial No. 480,118, filed January 6, 1955 now Patent No. 2,951,436, and like that structure has a generally U-shaped rod member 27 which has a horizontal axle portion extending along one side of the toaster and supported for rotatable movement by suitable flanges. At each end of the toaster frame extending from the axle portion of the rod are provided arms which complete the U and each of which swings through an arc. At the end of the toaster shown in FIG. 1, the arm of member 27 is designated 27a and is coupled at its end through link 28 to the toaster carriage. At the other end of the toaster frame, as seen in FIG. 2, the arm denoted 27b is connected through a suitable link 29 to a piston 30 slidable within a dash-pot cylinder 31 fixed to the frame 10 to provide damping, and hence smoother, steadier movement of the carriage toward bread removing position. The end of the arm 27 is bent to provide a switch-actuating portion 33. As portion 33 moves into its lower position it contacts and moves leaf element 34 to move the contact 35 into fixed contact 36. Both contacts are supported together on an assembly fixed relative to the frame. For greater detail relative to this of structure, see the application of Hild et al., Serial No. 480,118, filed January 6, 1955, now Patent No. 2,951,436.

The structure thus far described is essentially like toasters in which the carriage is manually pushed downward into toasting position against a spring and upon completion of toasting the spring returns the carriage to bread-removing position. The present toaster, however, is intended to be a fully automatic toaster and employs spring means of a different form from Hild's spring which is manually stressed. In the present structure, when a slice of bread is placed into one of the wells of the toaster, it will cause the carriage to automatically lower to toasting position, toasting will proceed after the carriage is in toasting position and, thereafter, the carriage will rise to the bread-removing position and remain there.

Figure 11:
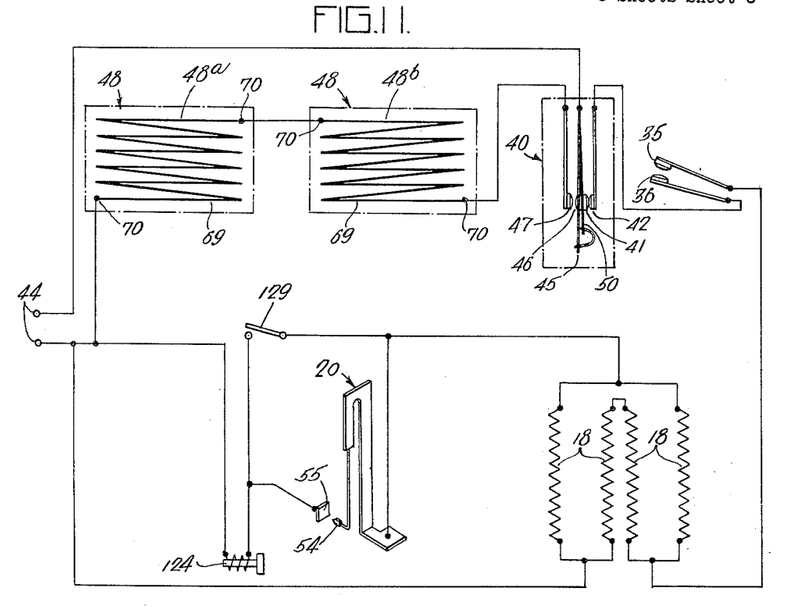
FIG. 11 is a schematic wiring diagram showing electrical elements of the toaster.

In order to accomplish this sequence of operation, the elements shown schematically in the circuit of FIG. 11 are used in accordance with the present invention. In series with contacts 35—36 is a pair of contacts 41—42 in a selector switch 40, which contacts, when positioned as shown, enable the circuit to be closed through contacts 35—36 to energize the heating elements 18 across power input terminals 44. Alternatively, the selector member 45 of switch 40 may be repositioned so that contacts 46 and 47 are closed, thus connecting a thermal motor 48, which is divided into two sections 48a and 48b, across terminals 44.

The selector switch is a double-throw two-position snap action switch, preferably supported on the frame. Actuation of the switch selector member 45 is accomplished through an insulated extension 49 against which actuators on or associated with the bread carriage are effective. Under the urging of the actuator 62, the selector member 45 moves to close one set of contacts and open the other. This occurs in a snap action because of the over-center toggle arrangement whereby a blade 50 is supported in the same plane as resilient selector member 45 and connected to the support blade by a spring 51 which urges apart and into different planes member 45 and blade 50 which it connects. Therefore, when the selector member 45 is moved by actuator 62 into the plane of blade 50, the spring 51 causes a snap action causing blade 50 to move to the other side of selector member 45 under the urging of spring 51. Since blade 50 carries the contacts 41 and 46, this snap action makes for rapid switching from one set of contacts to the other. The fixed contacts 42 and 47 are each supported on relatively fixed blades spaced apart a sufficiently small distance that the selector member which supports the movable contacts will easily move its appropriate contact into its cooperating fixed position contact each time switching occurs. There is no fixed neutral position required or provided by the switch.

The fixed blades are preferably fixed mechanically to but electrically insulated from blade 50. The means mechanically holding the assembly together may be a clamp around a pair of outside insulators between which are alternate metallic blades and insulators, or the holding means may be a suitable bolt, properly insulated. In operation, the contacts 46 and 47 are closed by action of the actuator 62 and opened by the actuator 103, as will hereafter be described. Actuator 103, therefore, serves to close contacts 41 and 42.

Figure 3:
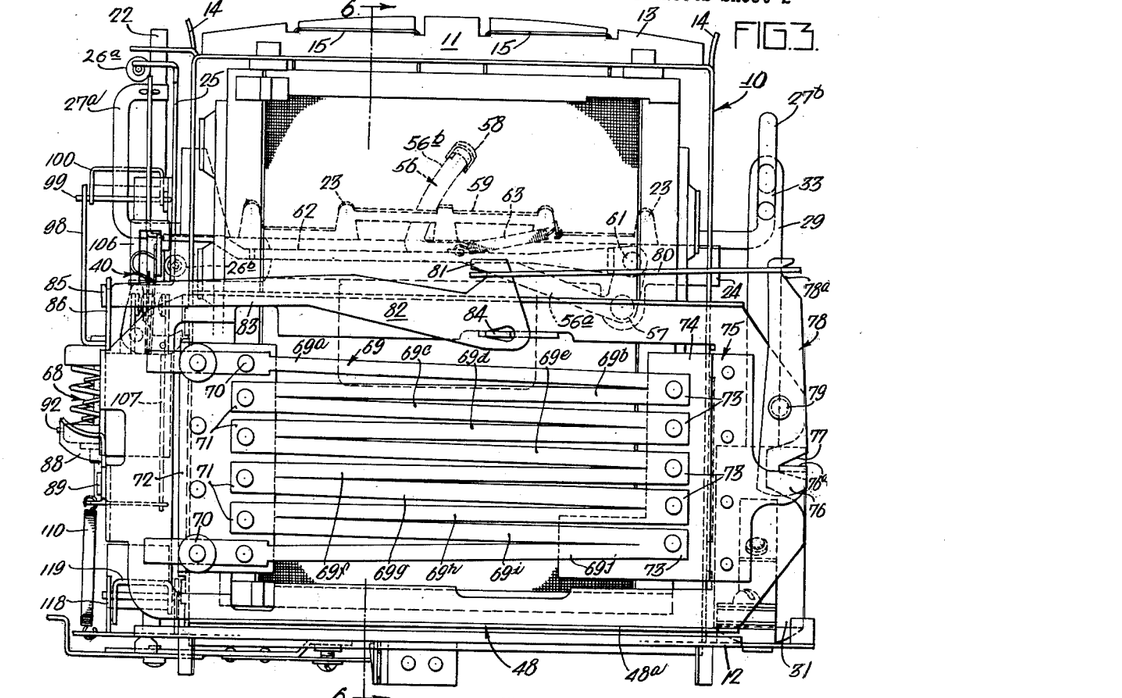
FIG. 3 is a side elevational view partially in section of one side of the toaster.
Figure 4:
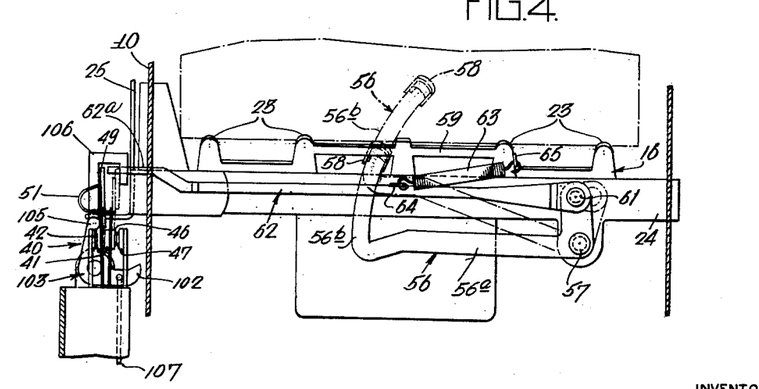
FIG. 4 is a partial view of that switch actuator mechanism which energizes the motor means.

Returning to consideration of FIGS. 3, 4, 7 and 10, and particularly the structure of FIGS. 3 and 4, it will be seen that, attached to one rack 24 by pivot pin 57, there is provided a lever 56 having a short arm 60 extending transversely of a longer arm 56a. Formed as a part of long arm 56a and comprising its free end is a transversely extending curved portion 56b, preferably in the form of a segment of a circle having as its radius arm 56a and as its center the pivot 57, which portion extends upwardly into a bread well, being provided with a transverse tab 58 for engagement with a bread slice. Tab 58 also serves as a stop, when the lever is depressed to a position shown in solid lines, by engaging limit bar 59 positioned between two adjacent fingers 23 on rack 24. The end of short lever arm 60 is connected by means of a pin 61 to actuator 62 which is supported by suitable guides on the carriage frame to move horizontally toward the switch structure 40. Restraining the actuator 62, and urging it away from the switch, is a spring member 63 which extends between a small tab 64 on the actuator 62 and a tab 65 on rack 24. This spring not only serves to urge the actuator away from the switch but also normally urges the lever member 56 into the uppermost position shown in dashed lines in FIG. 4. When a slice of bread is inserted into the bread well and rests on tab 58, the weight of the bread slice overcomes the urging of spring 63, and lever 56 moves downward which moves actuator 62 to the left, as shown in the drawings. As can best be seen in FIG. 10, the extension 49 of selector member 45 has a laterally extending projection 49a which is the part which the actuating end 62a of the actuator 62 strikes as it moves horizontally. This movement, as previously described, is effective to close the contacts 46 and 47 of selector switch 40, thereby energizing the thermal motor, and open the contacts 41 and 42.

It will be observed that projection 49a is vertically relatively narrow and as the carriage structure moves downwardly under gravity, as a result of energization of the thermal motor, actuator end 62a is able to move farther to the left, as viewed in the drawings, and thereby to underlie projection 49a. The actuator 62 will remain in this position as long as the bread on the lever 56 is in effective position to keep it there. Hence, when the carriage is raised, actuator end 62a will engage the lower edge of projection 49a, and actuator 62 will pivot on pin 61. When the toast is removed from the well, lever 46 will rise and spring 63 will retract actuator 62, disengaging end 62a from the lower edge of projection 49a and permitting end 62a to rise until it is again in a position to actuate extension 49 when a new slice of bread is inserted.

The thermal motors are coupled to the carriage through spring member 68 (see FIG. 1 and FIG. 10) by means of suitable linkages and levers. In accordance with the present embodiment of the invention, the spring 68 is a compression spring and the arrangement of the structure is such that the spring moves bodily downwardly as the thermal motor heats to allow the toaster carriage to move downwardly to toasting position. Once in toasting position, the carriage is restrained against upward movement so that upon cooling of the thermal motor and contraction of its system a stress is imposed upon the spring storing energy therein for later movement of the carriage.

Figure 10:
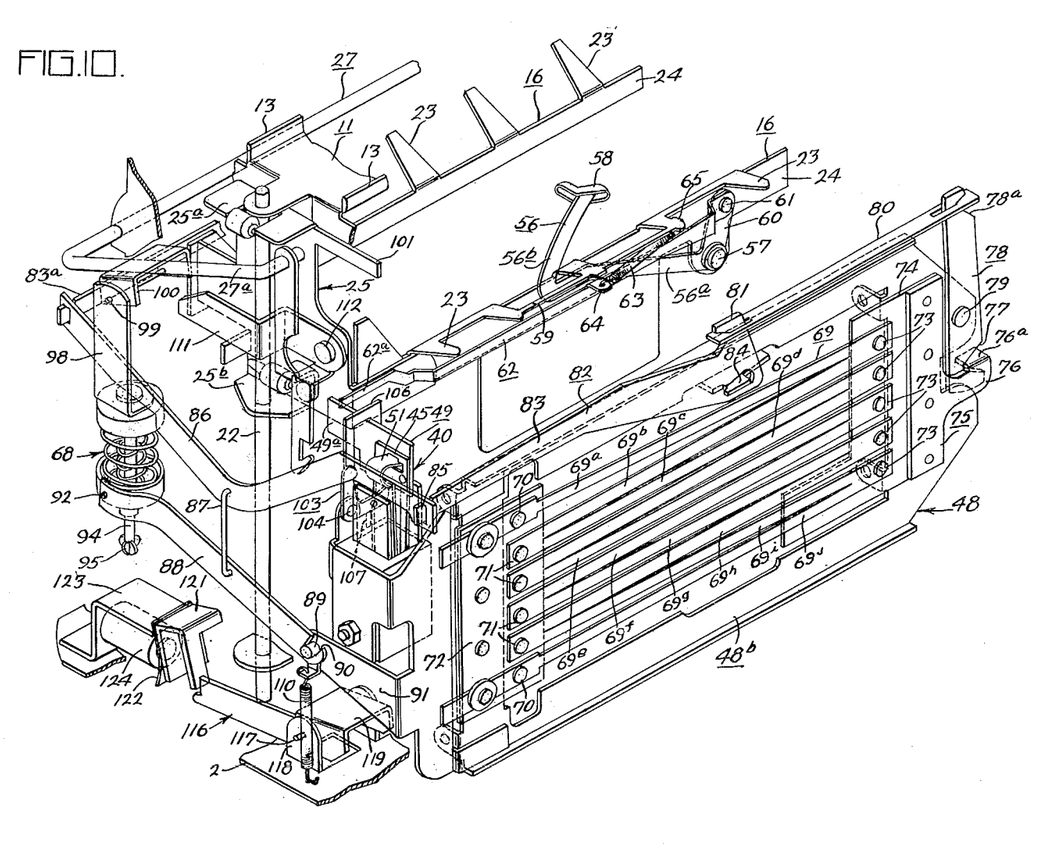
FIG. 10 is a perspective view of the motor means and structure relating to movement of the carriage.

The nature of the thermal motors can be best understood by reference to FIGS. 3 and 10, which actually illustrate thermal motor 48b. Thermal motor 48b, however, is identical in function but inverse in arrangement to thermal motor 48a on the other side of the toaster. The active element of the thermal motor is a zigzag resistance strip having multiple legs 69a, 69b, 69c, etc. connected in series by means of connections at alternate ends. The whole active element is preferably provided from a unitary sheet. Alternate ends at one end of the structure, including preferably the two terminal ends 70 as well as intermediate ends 71, are attached to insulator member 72 which is affixed to the toaster frame adjacent the end at which the spring 68 is located. Intermediate ends 73 are connected to a similar insulating member 74 which is free to move lengthwise of the frame. Member 74 is, in turn, connected to a metallic end plate 75 provided with a tab 76 having a horizontally extending portion 76a. This tab extension 76a is, in turn, engaged by a groove 77 at the lower end of a vertically extending lever 78. Lever 78 is pivotally affixed to the frame by pin 79 intermediate its ends, preferably closer to its grooved end than its free end. The free end of lever 78 is provided with a groove 78a and extends through and engages the edge of an eyelet in one end of horizontally extending link 80. Link 80 extends horizontally above the structure of the thermal motor to a point about half-way along the length of the thermal motor and is provided with another eyelet at its other end. Through this other eyelet extends short vertical arm 81 of bellcrank 82 by means of a groove engaging the edge of the eyelet. This same crank, generally designated 82, has a long horizontal arm 83 and is pivoted on a flange 84 on the frame. At the end of arm 83 is a hook portion 85 which engages an eyelet in yoke 86. Yoke 86 extends across the end of the toaster (see FIGS. 1 and 10) between the crank arms 83 and 83a.

Yoke 86 is, in turn, connected at its midpoint by a link 87 to an intermediate point of lever member 88. The level member is supported at one end by pin 89 on flange 91 on the toaster frame structure. A groove 90 in lever member 88 opens upwardly. Spring 110 connects the lever 88 in the region of groove 90 to the toaster frame and for a reason which will appear hereafter urges the end of lever 88 downward. The other end of the lever is connected by pin 92 to a cup structure 93 which accepts the bottom of the coil compression spring 68. Rod 94 passes axially through cup 93 and terminates at its bottom in a stop 95 formed by deforming the end of rod 94. Rod 94 passes through a bearing portion 93a in order to serve as a guide for the cup. Rod 94 passes along the axis of helical compression spring 68 which, as can be seen in FIG. 1, is preferably a double coil helical spring, one of larger diameter 68a and one of smaller diameter 68b.

The upper end of spring 68 is engaged by a similar cup member 97 to which rod 94 is fixed and cup 97 is, in turn, fixed by a link 98 by a pivot member 99 to a slide 100 slidable along arm 27a. As previously mentioned arm 27a is, in turn, pivotally coupled to link 28 which is pivotally connected to the carriage.

Operation of the switching device initiating actuation of the thermal motor has been previously described. The operation of the thermal motor itself will now be considered with reference to FIGS. 1, 3 and 10. As previously described, when the thermal motors 48a and 48b are placed across the power terminals 44 (see FIG. 11) and thereby energized, connection into the circuit is made through terminal ends 70 as shown in FIG. 11. As current flows through the elements 69a, 69b, 69c, etc., these elements will expand due to their internal resistance. Since they are attached at one end by a member 72 to the toaster frame, the slack created by their expansion is taken up at the other end where their ends 73 are attached through insulator 74 to the metallic plate 75 which is movable. Connection is made through extension 76a to lever 78. Tension is applied at extension 76a through the chain of linkages and levers previously described because of the weight of the carriage acting as a biasing forces. More specifically, extension 76a releases the pull on lever 78 thereby allowing the link 80 to move to the left as seen in FIGS. 3 and 10. The linkage associated with the thermal motor 48a performs in essentially the same way and thereby permits counterclockwise rotation of the arms 83 and 83a as used in FIG. 10. Rotation of arms 83 and 83a allows the yoke member 86 to move downward and this movement permits the lever 88 to move downward about its pivot point 89, thereby lowering cup 93 which engages the lower end of spring 68. When cup 93 reaches stop 95, spring 68 is still partially stressed and remains so while lever 88 continues to move downward, bodily carrying with it spring 68 and cup 97.

The lowering of end cup 97 results in the lowering of arm 27a through the lowering of intermediate link 98, pin 99 and slide 100 actuated by the weight of the carriage structure.

As the carriage approaches its lower toasting position, a portion of the carriage designated 101 in FIG. 8 strikes arm 102 part of actuator 103 pivoted about pin 104 to the frame. As the carriage moves downwardly and strikes arm 102 it causes rotation in a clockwise direction as seen in FIG. 8 and thereby causes arm 105 of actuator 103 to move selector member 45 past its center point whereupon the snap action of the switch causes the opening of contacts 46 and 47 and the closing of contacts 41 and 42. This disconnects the thermal motor and energizes the heating elements. FIG. 8 shows actuator 103 after actuation, its position before actuation being suggested by the dashed line representing arm 102. Inverted U-shaped structure 106 brackets the selector member 45 of the switch and acts as a limiting stop in both directions.

When the thermal motor is deenergized and the carriage is in its upward position the weight of the carriage, acting through spring 68, tends to rotate lever 88 in a counterclockwise direction about the pivot connection of link 87. This causes the bottom of groove 90 to engage pin 89. This condition is also true when the thermal motor is energized and the carriage is lowering by gravity. If, however, the motion of the carriage is arrested before it reaches toasting position, further expansion of the thermal motor will remove all stress from the left hand end (as viewed in FIG. 1) of lever 88 and will permit spring 110 to pull the right hand end of lever 88 downward, this motion being permitted by groove 90. Tie rod 107 is connected to lever 88 adjacent the point of attachment of spring 110 (see FIG. 3) and at its other end it is attached to actuator lever arm 102 (see FIG. 4). When the right hand end of lever 88 moves downward, tie rod 107 pulls arm 102 downward, thereby shifting selector member 45 which terminates the energization of the thermal motor. Subsequent cooling of the thermal motor will restress the spring and urge the carriage upwardly toward bread-removing position.

Figure 5:
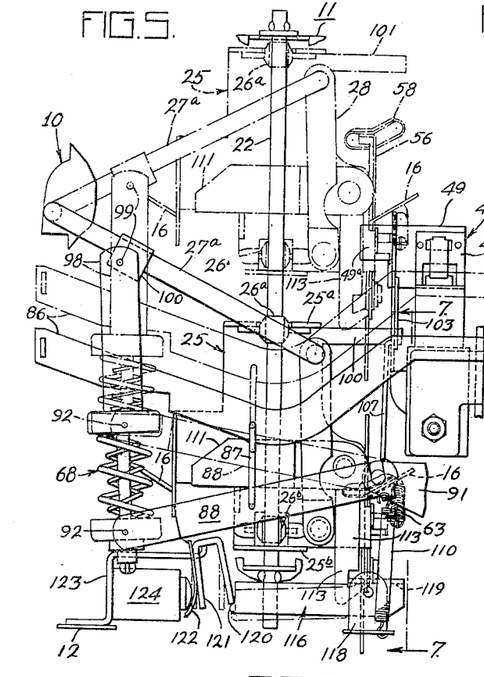
FIG. 5 is a view from one end of the linkage mechanism used to move the toaster carriage structure.

The positions assumed by various parts in the extreme bread-removing and toasting positions of the toaster may be seen in FIG. 5 wherein solid lines represent the positions with the carriage in toasting position.

Once the carriage has reached its lower or toasting position, it is latched in place. The latching means employed and illustrated in this instance is essentially the same as that taught in the U.S. application of John J. Lawser, Serial No. 479,004, filed December 31, 1954, now Patent No. 2,951,432. This structure can be best understood by reference to FIGS. 1 and 10. Pivotally supported on the portion 25 of the bread carriage by pin 112 is latch member 113. Latch member 113 is arranged to hang downward in response to the effect of gravity. However, it is provided at its bottom edge with a sloping cam surface 114 which tends to make it swing clockwise, as viewed in FIGS. 1 and 10, when it strikes the edge of horizontal member 119. As the carriage lowers the cam surface clears the horizontal portion and a cut-away area 115 falls opposite that portion. The reaction due to gravity on latch 113 then causes hook portion formed by cut-away area 115 to rotate counterclockwise to underlie horizontal member 119. The horizontal member 119 is part of lever member 116 which is pivotally supported by pin 117 to a portion of the frame 118. As can best be appreciated from FIG. 10, the engagement of the hook 115 beneath the flange 119 tends to impart a clockwise rotation to the lever 116 when spring 68 is stressed and the carriage is urged upward by virtue of the force acting upon the short lever arm between the edge of the member 119 and the pin 117. The end of lever 116 is provided with a small protuberance 120 which provides a shoulder over which one arm of a U-shaped member 121 is urged by a suitable spring member 122. U-shaped member 121 and its spring are supported on a bracket 123 fixed to the toaster frame, which bracket also supports an electromagnet 124 whose core attracts that arm of the U-shaped member 121 adjacent to it. Until the electromagnet is energized, however, the spring 122 holds the U-shaped member 121 against the end of lever 116 and frictionally prevents its rotation, or mechanically holds it in place against the protuberance 120 as a shoulder. Upon energization of the electromagnet 124, however, if sufficient energy has been stored in spring 68, the carriage will be urged upward and the force acting through latch member 113 on member 119 will rotate the lever arm 116 in a clockwise direction, as viewed in FIG. 1, until the hook 115 is free of member 119. The lever 116 will thereupon return to its position shown in FIG. 1 due to the effect of gravity and, upon deenergization of electromagnet 124, the U-shaped member 121, under the urging of spring 122, will assume its previous position.

The force required to lift the carriage to bread-removing position is accomplished by compressing spring 68 upon the cooling of the thermal motor. As the thermal motor cools, it contracts and exerts a pull on lever 78 tending to move it in a clockwise direction as seen in FIG. 10. This, in turn, provides a tensional pull in link 80 pulling arm 81 of crank 82 in a clockwise direction and, therefore, through arm 83, urging the yoke 86 upward. The upward urging of yoke 86 will tend, through the link 87, to pull the lever 88 upward about its pivot 89 to compress the spring 68 against cup 97 as upward pressure is exerted to end cup 93. When the latch is released, the energy stored in the compressed spring is sufficient to raise the carriage to bread-removing position.

Figure 6:
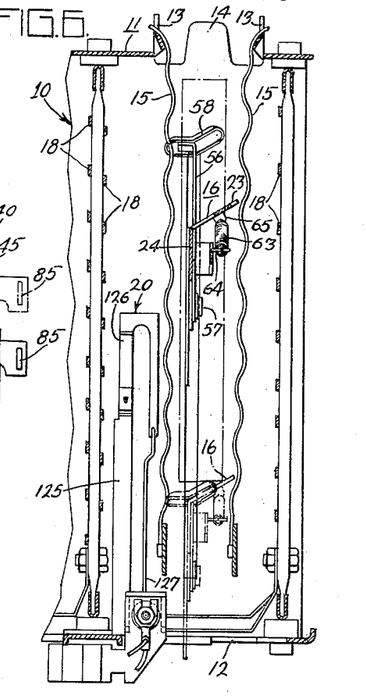
FIG. 6 is a partial sectional view taken along line 6—6 of FIG. 3.

Actuation of the electromagnet 124, as may be seen in FIG. 11, is dependent upon the closing of the contacts 54, 55 of thermostatic switch 20. Details of the thermostatic switch may be seen in FIGS. 6, 7 and 9. The thermostat 20 is preferably of the type described in U.S. Patent No. 2,667,115 to W. H. Vogelsberg and consists of a support arm 125 supported on the frame structure at one end and supporting at its free end a U-shaped bimetallic member 126. The free end of the leg which responds to bread surface temperature is attached to a rigid conductor 127 which terminates in a pointed movable contact 54 (see FIG. 9). A fixed contact 55 is supported on the frame of the structure. If desired, a suitable positioning means described in U.S. Patent 2,796,492 to J. J. Lawser may be employed to adjust the position of the fixed contact to provide for different thermal conditions at contact closure. The thermostat is arranged so that the movement between its open position shown in FIG. 7 and its closed position shown in FIG. 9 will be accomplished at the time the toast is toasted to the desired degree.

Considering now a complete toasting cycle, prior to commencement of the operation switch contacts 41—42 are in closed position, contacts 35—36, 46—47, and 54—55 are open, and the carriage is held in bread receiving position by spring 68 which has been stressed by a contraction of the thermal motor 48. The toasting operation is initiated by dropping a slice of bread into a bread well. The weight of the bread slice depresses lever 56 which moves actuator 62 into engagement with projection 49a of selector member 45. This shifts the double throw switch, opening contacts 41—42 and closing contacts 46—47, thereby energizing the thermal motor 48. Expansion of the thermal motor permits spring 68 to move bodily downward, thereby permitting the carriage to move to toasting position under the force of gravity. When the carriage reaches toasting position, contacts 35—36 are closed, the carriage is latched, and portion 101 of the carriage engages actuator 103 which opens contacts 46—47, thereby deenergizing the thermal motor, and closes contacts 41—42, thereby energizing the heating elements. The toasting operation proceeds while a cooling of the thermal motor stresses spring 68. Toasting is terminated by the closure of contacts 54—55 associated with the thermostatic switch 20. This energizes electromagnet 124 which causes a release of the carriage latch, whereupon the stored energy in spring 68 moves the carriage to bread-removing position.

Alternately, the latch may be released by closure of switch 129, or by manual means engaging the latch.

In the upward movement of the carriage, end 62a of actuator 62 will engage the lower edge of projection 49a, actuator 62 pivoting on pin 61. When the toast is removed from the bread well, spring 63 will retract actuator 62, permitting end 62a to rise until it is again in a position to energize the thermal motor when a new slice of bread is inserted.

Just as many modifications in the motor means are possible and modifications in other parts of the structure are equally possible. All modifications within the scope of these claims are intended to be within the scope and spirit of the present invention.

I claim:
1. An automatic bread toaster having a frame providing at least one bread-receiving well, bread carriage means within said well movable between a toasting position at the lower part of the well and a higher bread-removing position, spring means adapted to effect movement of the carriage from one position to the other in the course of releasing stored energy, motor means which, upon energization, permits the carriage to move under gravity in the direction opposite to its movement in response to the spring means, and means operatively connected with the motor means conditioned to store energy in the spring as a result of deenergization of the motor means, said last named means being the sole means for said storing of energy.

2. The toaster of claim 1 in which latch means is provided between the carriage and the frame effective to hold the carriage in the position to which it is permitted to move by gravity against the spring which is stressed after the motor means is deenergized.

3. The toaster of claim 2 in which the spring means extends between the bread carriage means and the means operatively connected with the motor means said connection including a movable structure so arranged that as the motor means is energized to permit movement of the carriage the whole spring will move correspondingly to a position in which the latch means is latched and thereafter the latch means will oppose the means operatively connected with the motor means after deenergization and cause the spring to become additionally stressed.

4. The toaster of claim 3 in which means is provided to terminate the effect of the motor means when the carriage is in a position to be latched.

5. The toaster of claim 4 in which means is provided to terminate the effect of the motor means including a switch on the frame and a switch actuator on the carriage positioned to cooperate with the switch.

6. The toaster of claim 2 in which the motor means is a thermal motor which produces motion by expansion upon heating and contraction upon cooling and which is heated by its internal resistance to current flow.

7. The toaster of claim 6 in which the spring means is a coil spring arranged to be compressed to effect the storage of energy upon cooling of the thermal motor.

8. In an automatic bread toaster having at least one bread-receiving well, bread carriage means within said well movable between a toasting position at the lower part of said well and a higher bread-removing position, spring means adapted to effect movement of the carriage from its lower toasting position upward toward bread-removing position in the course of releasing stored energy, motor means which, upon energization, releases the carriage to be lowered by gravity, and means operatively connected with the motor means conditioned to store energy in the spring after the motor means is deenergized said last named means being the sole means for said storing of energy.

9. The toaster of claim 8 in which latch means is provided between the carriage and the frame effective to hold the carriage in toasting position against the spring which is stressed after the motor means is deenergized.

10. The toaster of claim 9 in which thermostatic means is provided to release the latch means upon completion of toasting.

11. The toaster of claim 9 in which the spring is operatively connected between the bread carriage means and the motor means.

12. The toaster of claim 11 in which a switch is provided in circuit with the motor means to control its energization and an actuator responsive to carriage position is provided to close the switch when bread is placed on the carriage.

13. The toaster of claim 12 in which the actuator includes a slide member laterally movable into the switch-operating mechanism which slide member is pivotally coupled to and actuated by a lever actuated by bread placed on the carriage and spring-biased out of the switch-actuating position.

14. The toaster of claim 13 in which the lever is a generally L-shaped member pivoted at the remote end of the longer arm of the L whereby the whole L lever serves as one arm of a crank, the other arm of which is a shorter extension transverse to the long arm of the L to which the slide member is pivotally attached.

15. The toaster of claim 10 in which the motor means is a thermal motor which responds by expansion upon heating and contraction upon cooling, the heating being produced by internal resistance of the unit to current flowing through it.

16. The toaster of claim 10 in which the spring means is a coil compression spring adapted to be compressed by action of the motor means.

17. The toaster of claim 9 in which manual means is additionally provided to permit movement of the carriage from the bread-toasting to bread-removing position by releasing said latch.

18. A bread toaster having a support frame and a carriage movable relative to the frame, electrical means adapted when energized to permit lowering of the bread carriage from bread-removing position, switch means on the frame controlling energization of the electrical means, first actuator means to close the switch in order to effect the lowering of the carriage, second actuator means on the frame positioned to be struck by a portion of the carriage when the carriage reaches toasting position to cause movement of the second actuator means to open said contacts and effect the deenergization of the means permitting lowering the carriage and means operatively connected with said last named means conditioned to store energy in a carriage lifting spring as a result of said deenergization.

19. The structure of claim 18 in which the second actuator is a crank which is pivoted to the frame and one arm of which is moved by the carriage as it is lowered to move the other arm into the switch-operating mechanism to deenergize the electrical means.

20. The toaster of claim 15 in which there are a pair of thermal motors on opposite sides of the toaster each fixed to the frame at the same end of the toaster and free at the opposite end, suitable lever and linkage members from the free end of each motor back to the end at which the thermal motors are fixed, said lever and linkage members being terminated in a yoke member which joins the two systems together and is connected in turn to the spring means.

21. The toaster of claim 20 in which the free end of each thermal motor is connected to the lower end of a vertically extending lever pivoted to the toaster frame, the upper end of said vertical lever is connected to a link extending horizontally about half the length of the toaster, the other end of the link is connected to the short vertical arm of a crank member pivoted to the toaster frame, the long arm of which crank member extends horizontally to the end of the frame and is connected to the yoke member.

22. The structure of claim 21 in which the yoke member is connected by a suitable link to a lever member connected to the frame at one end and to the spring at the other end.

23. In a toaster structure having a support frame and a carriage movable relative to the frame, a carriage lifting lever arm pivoted on the frame adapted to move the carriage, a second lever arm pivoted at one end to the frame, a force-applying motor means connected to said second lever arm intermediate its ends, and a spring connected between the end of the second lever arm and the carriage-lifting lever arm in such manner that the whole spring moves bodily in one direction when the carriage moves in the same direction.

24. In an automatic bread toaster having at least one bread-receiving well, bread carriage means within said well movable between a bread-removing position at the upper part of the well and a lower toasting position, a movable structure adapted to support said bread carriage means, motor means which, upon energization, is effective to move said movable structure downward whereby said carriage means may move toward toasting position under the influence of gravity, a switch for the energization of said motor means, first means operatively connected with the carriage for opening the switch when the carriage reaches toasting position, second means operatively connected with said movable structure for opening the switch, effective only upon the separation of the carriage and movable structure as a result of interference with downward motion of the carriage before the carriage reaches toasting position and third means for holding said second means ineffective when the carriage is supported by said movable structure.

25. The toaster of claim 24 including a lever having one end pivoted to the frame and the other end engaging the movable structure, said motor means being arranged to apply force to said lever intermediate its ends, means permitting the pivoted end of said lever to move in the direction parallel to that of the force application, said second means for opening said switch comprising spring means arranged to move said pivoted end in said direction effective only upon interference with the downward motion of the carriage means, and means connecting said lever to a switch controlling said motor.

26. In an automatic bread toaster having at least one bread receiving well, bread carriage means within said well movable between a toasting position at the lower part of said well and a higher bread removing position, a spring operatively connected with said carriage arranged to effect movement of the carriage from its toasting position toward bread removing position and to hold the carriage in bread removing position, motor means, and a movable structure extending between said motor means and said spring, effective on energization of said motor means to bodily move said spring in such direction as to permit the carriage to move to toasting position under the force of gravity while substantially retaining the condition of stress in said spring that existed when the carriage was in bread removing position.

27. The toaster of claim 26 in which there is provided latch means between the carriage and the frame effective to hold the carriage in toasting position and permitting the development of additional stress in said spring means after the motor means is deenergized.

28. The structure of claim 14 in which the slide member, when moved laterally under the urging of the weight of a slice of bread, is adapted to engage and deflect a switch-operating member when the carriage is in the bread-removing position and to slide vertically along a portion of said switch-operating member as the carriage is lowered, said portion being of limited vertical length whereby said slide member eventually passes the lower edge of said portion and then moves farther in a lateral direction, said farther movement bringing the slide member into a position wherein it engages the underside of said portion as the carriage is raised, thereby preventing further actuation of the switch until removal of the bread which releases the slide.

29. In an automatic bread toaster having at least one bread-receiving well, electric heating means disposed on opposite sides of said well, bread carriage means within said well movable between a toasting position at the lower part of the well and a higher bread-removing position, spring means adapted to effect movement of the carriage from toasting position toward bread-removing position, motor means which, upon energization, causes a movement of the carriage toward toasting position, a two position snap-action double-throw switch arranged to be in circuit with said motor means when in one position and to be in circuit with said heating means when in the other position, a second switch in series circuit with said heating means and said double-throw switch, means responsive to the insertion of a bread slice in said well to shift said double-throw switch from the circuit comprising the heating means to the circuit comprising the motor means, means to reverse said double-throw switch and to close said second switch when the carriage reaches toasting position, and means to open said second switch when the carriage moves away from toasting position.

30. The toaster of claim 24 including a lever pivoted to the frame including a lost-motion connection between the lever and its pivotal mounting, said movable structure comprising a first spring operatively connected with said lever arranged to support the carriage means and to effect movement thereof from toasting position upward toward bread-removing position, said spring being also arranged to urge said lever in a given direction in relation to said lost-motion connection, means for operatively connecting said motor means with said lever, a second spring interconnected with said lever effective to move the lever in a direction opposite to said given direction in relation to said lost-motion connection when there is separation between said carriage means and said movable structure, and means connecting said lever to said switch arranged to deenergize the motor means when said second spring operates to shift the lever in relation to the lost-motion connection.

References Cited in the file of this patent

UNITED STATES PATENTS

| | | |
|---|---|---|
| 2,288,713 | Ireland | July 7, 1942 |
| 2,658,443 | Brace | Nov. 10, 1953 |
| 2,773,441 | Ireland | Dec. 11, 1956 |
| 2,835,193 | Ireland | May 20, 1958 |
| 2,877,702 | Turner | Mar. 17, 1959 |
| 2,920,550 | Schmall et al. | Jan. 12, 1960 |